(12) United States Patent
Wei et al.

(10) Patent No.: US 6,384,364 B1
(45) Date of Patent: May 7, 2002

(54) METHOD OF ALIGNING ELECTRODE IN MULTIPLE-AXIS EDM DRILLING

(75) Inventors: Bin Wei, Mechanicville, NY (US); David John Grubish, Maplewood, MN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/741,105

(22) Filed: Dec. 21, 2000

(51) Int. Cl.[7] .................................................. B23H 1/00
(52) U.S. Cl. ........................................................ 219/69.17
(58) Field of Search ............................ 219/69.16, 69.17, 219/69.13, 69.15; 700/192, 162

(56) References Cited

U.S. PATENT DOCUMENTS 4,771,157 A * 9/1988 Sato et al. ............... 219/69.16
6,301,520 B1 * 10/2001 Hayashi ..................... 700/192
6,326,579 B1 * 12/2001 Krawczyk et al. ....... 219/69.15

FOREIGN PATENT DOCUMENTS

| JP | 63-134125 A | * | 6/1988 | |
| JP | 1-234117 A | * | 9/1989 | ............ 219/69.17 |

* cited by examiner

*Primary Examiner*—Geoffrey S. Evans
(74) *Attorney, Agent, or Firm*—Banner & Witcoff, Ltd.

(57) ABSTRACT

An electrode of an EDM drill is aligned in at least two planes by positioning the electrode at a plurality of positions and determining the distances between the rotary center of the EDM drill and a plurality of points on the workpiece surface co-linear with the longitudinal axis of the electrode. By comparing these distances, it can be ascertained whether the electrode is aligned with the workpiece surface in a given plane. If the electrode is not aligned, an angle of rotation needed to align the electrode with the workpiece surface can be determined empirically.

11 Claims, 2 Drawing Sheets

METHOD OF ALIGNING ELECTRODE IN MULTIPLE-AXIS EDM DRILLING

BACKGROUND OF THE INVENTION

Electrodischarge machining (EDM) is a common technique used, for example, for drilling holes in turbine airfoils of a gas turbine engine. EDM drilling essentially involves placing an electrode in a spaced relationship with the workpiece from which it is desired to erode metal by erosive electrical intermittent discharge. The pulsating discharges erode metal until a hole of desired dimensions is formed, after which time the electrode is withdrawn from the proximity of the workpiece.

One of the problems encountered in EDM drilling is achieving proper alignment of the workpiece with the electrode. Difficulties in alignment may result, for example, from the workpiece not having a good datum surface, or from the EDM machine not having any datum relation to the workpiece at all. In the case of portable EDM drilling systems, a workpiece typically is not placed on an EDM worktable, but rather on a separate fixture that is not connected to the EDM machine. Operators generally must rely on the use of simple gauges or visual observation to carry out alignment by trial-and-error. Often the workpiece itself is expensive, which makes alignment by trial-and-error wholly unacceptable, as inaccurate drilling can cause irreparable damage to the workpiece.

There remains a need for a more efficient and accurate method for aligning electrodes in EDM drilling.

BRIEF SUMMARY OF THE INVENTION

The present invention is directed to a method of aligning an electrode with a workpiece in at least two planes in a multiple-axis electrodischarge machining (EDM) drill. The EDM drill comprises at least two rotary axes and a chuck for receiving a first end of the electrode. The electrode has a longitudinal axis and a distal end extending a predetermined distance from the rotary center of the rotary axis of the EDM drill.

In a preferred embodiment of the invention, the electrode is aligned with the workpiece using at least four points of reference on the workpiece. The method comprises placing the workpiece in approximate visual alignment relative to the electrode positioned along a first axis. The electrode then is positioned at a first angle, in a first plane and in a first direction relative to the first axis. A first distance between the rotary center of the rotary axis and a first point on the workpiece co-linear with the longitudinal axis of the so-positioned electrode is determined.

The electrode next is positioned at the first angle, in the first plane, but in the opposite direction relative to the first axis. A second distance between the rotary center of the rotary axis and a second point on the workpiece co-linear with the longitudinal axis of the so-positioned electrode is determined. By comparing the first distance to the second distance, it can be determined whether the electrode is aligned with the workpiece in the first plane. For example, when the intended position of the electrode is perpendicular to the workpiece, if the first distance and the second distance are equal, then the electrode is properly aligned in the first plane. If the electrode is not aligned, an angle of rotation needed to align the electrode with the workpiece in the first plane can be determined empirically.

The electrode then is aligned in a second perpendicular plane in an analogous manner. The electrode is positioned at a second angle, in the second plane and in a third direction relative to the first axis. A third distance between the rotary center of the rotary axis of the EDM drill and a third point on the workpiece co-linear with the longitudinal axis of the so-positioned electrode is determined.

The electrode thereafter is positioned at the second angle, in the second plane, but in the opposite direction relative to the first axis. A fourth distance between the rotary center of the rotary axis and a fourth point on the workpiece co-linear with the longitudinal axis of the so-positioned electrode is determined. By comparing the third distance to the fourth distance, it can be determined whether the electrode is aligned with the workpiece in the second plane. For example, when the intended position of the electrode is perpendicular to the workpiece, if the third distance and the fourth distance are equal, then the electrode is properly aligned in the second plane. If the electrode is not aligned, an angle of rotation needed to align the electrode with the workpiece in the second plane can be determined empirically.

The distance between the rotary center of the rotary axis and the various points on the workpiece co-linear with the longitudinal axis of the electrode can be determined using any suitable technique. One preferred way is to displace the electrode along its longitudinal axis into contact with the workpiece. The distance of displacement can be measured, e.g., by the EDM machine itself, and simply added to the fixed distance from the rotary center of the rotary axis to the distal end of the electrode.

If alignment is needed, the EDM machine (or an auxiliary computer, for example) can calculate and display the amount and direction of rotation needed for correcting alignment in each plane. Alternatively, the EDM machine can be adapted to automatically adjust the position of the electrode in response to the calculations.

In an alternative embodiment of the invention, an electrode is aligned with a workpiece in at least two planes using three reference points on the workpiece surface. The three reference points on the workpiece surface relative to the rotary center of the rotary axis are determined in a similar manner as previously described. These reference points then are used to mathematically determine the normal directions of the workpiece surface. Any necessary axis adjustments relative to the normal directions can be determined empirically.

The present invention provides an efficient and accurate method for aligning electrodes in multiple-axis EDM drilling. The alignment method of the present invention greatly reduces the risk of damage to workpieces during EDM drilling as a result of poor alignment, which is particularly important when expensive workpieces are drilled.

BRIEF DESCRIPTION OF THE DRAWINGS

The present invention will now be described in more detail with reference to preferred embodiments of the invention, given only by way of example, and illustrated in the accompanying drawings in which.

DETAILED DESCRIPTION OF INVENTION

Figure 1:
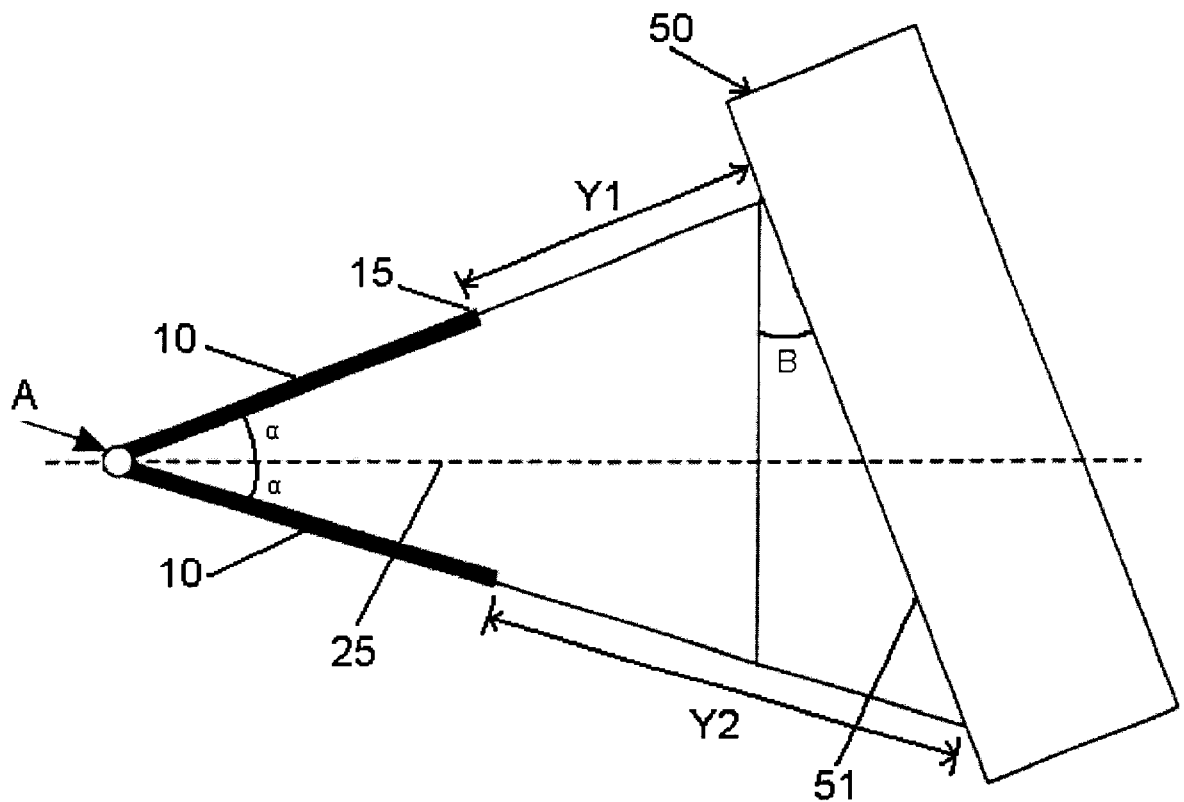
FIG. 1 is a schematic illustration of aligning an electrode with a workpiece in the Y-axis in accordance with a preferred embodiment of the invention.

With reference to FIG. 1, the present invention is directed to a method of aligning an electrode (10) with a workpiece

(50) in at least two planes in a multiple-axis electrodischarge machining (EDM) drill (not illustrated). The EDM drill comprises at least two rotary axes having a rotary center (A) and a chuck for receiving a first end of the electrode (10). The electrode (10) has a distal end (15) extending a predetermined distance from the rotary center of the rotary axis (A) of the EDM drill. The workpiece (50) initially is positioned in approximate visual alignment with the electrode (10), with the longitudinal axis of the electrode (10) extending along a first axis (25). The workpiece (50) should be placed within the workable reach of the electrode (10). In the embodiment illustrated in FIGS. 1 and 2, the electrode (10) is intended to be perpendicular to the workpiece surface (51). The angle of misalignment (B, C) is exaggerated in FIGS. 1 and 2 for purposes of illustration. The present invention also can be used for the alignment of electrodes (10) in orientations other than perpendicular to the workpiece surface (51).

Figure 2:
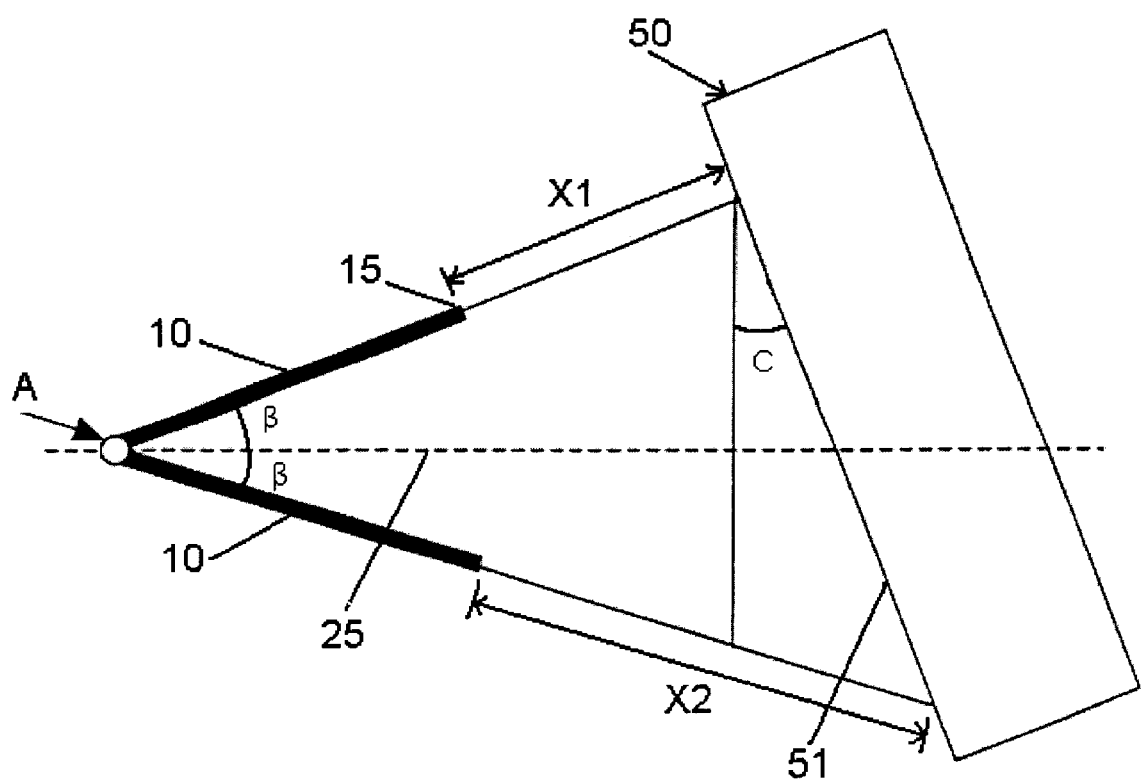
FIG. 2 is a schematic illustration of aligning an electrode with a workpiece in the X-axis in accordance with a preferred embodiment of the invention.

In a preferred embodiment of the invention and with reference to FIGS. 1 and 2, the electrode (10) is aligned with the workpiece (50) using at least four points of reference on the workpiece surface (51). The method comprises placing the workpiece (50) in approximate visual alignment perpendicular to the electrode (10) positioned along the first axis (25). The electrode (10) then is positioned at a first angle ($\alpha$), in a first plane and in a first direction relative to the first axis (25). The selected angle ($\alpha$) should be between a minimum angle that is greater than zero and the maximum angle that permits the line of the electrode (10) to reach a portion of the workpiece surface (51) (see FIGS. 1 and 2). Larger angles within this range generally have better accuracy and are preferable. Suitable angles vary over a wide range depending on the spacing of the workpiece (50) from the EDM machine and the dimensions of the workpiece surface (51). Preferred exemplary angles vary from about 5 to 20 degrees. Once the electrode (10) is so-positioned, the distance between the rotary center of the rotary axis (A) and a point on the workpiece surface (51) co-linear with the longitudinal axis of the electrode (10) is determined.

The electrode (10) then is returned to its original position along the first axis (25). Next, the electrode (10) is positioned at the first angle ($\alpha$) but in the opposite direction relative to the first axis (25), e.g., below the first axis (25) as illustrated in FIG. 1. A second distance between the rotary center of the rotary axis (A) and a point on the workpiece surface (51) co-linear with the longitudinal axis of the so-positioned electrode (10) is determined. By comparing the first distance to the second distance, it can be determined whether the electrode (10) is aligned with the workpiece surface (51) in the first plane. For example, when the intended position of the electrode (10) is perpendicular to the workpiece surface (51), if the first distance and the second distance are equal, then the electrode (10) is perpendicularly aligned relative to the first plane. If the electrode (10) is not aligned, an angle of rotation (B) needed to align the electrode (10) with the workpiece surface (51) in the first plane can be determined empirically.

With reference to FIG. 2, the electrode (10) then is aligned in a second perpendicular plane in an analogous manner. The electrode (10) is positioned at a second angle ($\beta$), in the second plane and in a third direction relative to the first axis (25). A third distance between the rotary center of the rotary axis (A) and a point on the workpiece surface (51) co-linear with the longitudinal axis of the so-positioned electrode (10) is determined.

The electrode (10) then is positioned at the second angle ($\beta$), in the second plane, but in the opposite direction relative to the first axis (25). A fourth distance between the rotary center of the rotary axis (A) and a point on the workpiece (50) co-linear with the longitudinal axis of the so-positioned electrode (10) is determined. By comparing the third distance to the fourth distance, it can be determined whether the electrode (10) is aligned with the workpiece (50) in the second plane. If the electrode (10) is not aligned in the second plane, an angle of rotation (C) needed to align the electrode (10) in the second plane can be determined empirically.

The distances (Y1, Y2, X1, X2) between the distal end (15) of the electrode and the co-linear points on the workpiece surface (51) can be determined using any suitable technique. One preferred way is to use the standard tool touch feature of an EDM machine by displacing the electrode (10) along its longitudinal axis into contact with the workpiece surface (51). After each distance is determined, the electrode is retracted from the workpiece surface (51) and returned to its original position, e.g., along the first axis (25). The distance of displacement (Y1, Y2, X1, X2) can be measured, e.g., by the EDM machine itself, and simply added to the fixed distance from the rotary center of the rotary axis (A) to the distal end (15) of the electrode (10).

If alignment is needed in either or both planes, the EDM machine (or an auxiliary computer, for example) can calculate and display the amount and direction of rotation (B, C) needed for correcting alignment in each plane. Alternatively, the EDM machine can be adapted to automatically adjust the position of the electrode (10) in response to the calculations.

For purposes of illustration, the present invention has been described with reference to workpieces having planar surfaces (51). It also is contemplated that workpieces having non-planar surfaces can be treated in an analogous manner. For example, the configuration of a non-planar workpiece surface can be determined using appropriate optical means or the like. This data then can be used to develop appropriate algorithms for aligning the electrode (10) with the non-planar workpiece surface.

With reference to the embodiment of FIG. 1, the angle of rotation (B) needed to align the electrode (10) in the Y plane is calculated using the equation:

If $Y1 > Y2$: $B = \arctan((Y1-Y2) \times \cot(\alpha)/(Y1-Y2)+2(HL+Y2))$

If $Y1 < Y2$: $B = \arctan((Y2-Y1) \times \cot(\alpha)/(Y2-Y1)+2(HL+Y1))$ where HL is the distance from the rotary center of the rotary axis (A) to the distal end (15) of the electrode (10).

Likewise, with reference to the embodiment of FIG. 2, the angle of rotation (C) needed to align the electrode (10) in the X plane is calculated using the equation:

If $X1 > X2$: $C = \arctan((X1-X2) \times \cot(\beta)/(X1-X2)+2(HL+X2))$

If $X1 < X2$: $C = \arctan((X2-X1) \times \cot(\beta)/(X2-X1)+2(HL+X1))$.

The electrode tip (15) and the workpiece surface (51) should be kept dry to avoid false tripping of the tool touch. The resolution of the rotary axis motion and the resolution of the tool touch also should be fine enough to obtain the desired level of accuracy.

In accordance with an alternative embodiment of the invention, an electrode can be aligned with a workpiece in at least two planes using three reference points on the workpiece surface. The three reference points on the workpiece surface relative to the rotary center of the rotary axis are determined in a similar manner as previously described. These reference points then are used to mathematically determine the normal directions of the workpiece surface. Any necessary axis adjustments relative to the normal directions can be determined empirically using a suitable algorithm, which can be developed by persons skilled in the art with the aid of no more than routine experimentation.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method of aligning an electrode with a workpiece in at least two planes in a multiple-axis electrodischarge machining (EDM) drill, wherein the EDM drill has at least two rotary axes having a rotary center and a chuck for receiving a first end of an electrode, wherein the electrode has a longitudinal axis and distal end extending a predetermined distance from the rotary center, the method comprising:

(a) placing a workpiece in approximate visual alignment relative to the electrode positioned along a first axis;
   (b) positioning the electrode at a first angle, in a first plane and in a first direction relative to the first axis; and determining a first distance between the rotary center and a first point on the workpiece co-linear with the longitudinal axis of the so-positioned electrode;
   (c) positioning the electrode at the first angle, in the first plane and in a second direction relative to the first axis that is opposite to the first direction; and determining a second distance between the rotary center and a second point on the workpiece co-linear with the longitudinal axis of the so-positioned electrode;
   (d) comparing the first distance to the second distance to determine whether the electrode is aligned with the workpiece in the first plane and, if the electrode is not aligned with the workpiece in the first plane, determining an angle of rotation needed to align the electrode with the workpiece in the first plane;
   (e) positioning the electrode at a second angle, in a second plane and in a third direction relative to the first axis; and determining a third distance between the rotary center and a third point on the workpiece co-linear with the longitudinal axis of the so-positioned electrode;
   (f) positioning the electrode at the second angle, in the second plane and in a fourth direction relative to the first axis that is opposite to the third direction; and determining a fourth distance between the rotary center and a fourth point on the workpiece co-linear with the longitudinal axis of the so-positioned electrode; and
   (g) comparing the third distance to the fourth distance to determine whether the electrode is aligned with the workpiece in the second plane and, if the electrode is not aligned with the workpiece in the second plane, determining an angle of rotation needed to align the electrode with the workpiece in the second plane.

2. The method of claim 1 wherein the first angle is from about 5 to about 20 degrees, and wherein the second angle is from about 5 to about 20 degrees.

3. The method of claim 1 wherein the first distance, the second distance, the third distance, and the fourth distance each are determined by displacing the electrode along its longitudinal axis into contact with the workpiece, and adding the distance of such displacement to the distance between the distal end of the electrode and the rotary center.

4. The method of claim 1 wherein the workpiece comprises a planar surface containing the first point, the second point, the third point, and the fourth point.

5. The method of claim 4 wherein the aligned position of the electrode is perpendicular to the planar surface of the workpiece.

6. The method of claim 5 wherein the angle of rotation needed to align the electrode in the first plane is calculated using the equation:

If $Y1>Y2$: $B=\arc\tan((Y1-Y2)\times\cotan(\alpha)/(Y1-Y2)+2(HL+Y2))$

If $Y1<Y2$: $B=\arc\tan((Y2-Y1)\times\cotan(\alpha)/(Y2-Y1)+2(HL+Y1))$ where Y1 is the distance from the distal end of the electrode to the first point, Y2 is the distance from the distal end of the electrode to the second point, $\alpha$ is the first angle, and HL is the distance from the rotary center to the distal end of the electrode.

7. The method of claim 5 wherein the angle of rotation needed to align the electrode in the second plane is calculated using the equation:

If $X1>X2$: $C=\arc\tan((X1-X2)\times\cotan(\beta)/(X1-X2)+2(HL+X2))$

If $X1<X2$: $C=\arc\tan((X2-X1)\times\cotan(\beta)/(X2-X1)+2(HL+X1))$ where X1 is the distance from the distal end of the electrode to the third point, X2 is the distance from the distal end of the electrode to the fourth point, $\beta$ is the second angle, and HL is the distance from the rotary center to the distal end of the electrode.

8. A method of aligning an electrode with a workpiece in at least two planes in a multiple-axis electrodischarge machining (EDM) drill, wherein the EDM drill has at least two rotary axes having a rotary center and a chuck for receiving a first end of an electrode, wherein the electrode has a longitudinal axis and a distal end extending a predetermined distance from the rotary center, the method comprising:

(a) placing a workpiece in approximate visual alignment relative to the electrode positioned along a first axis;
   (b) determining a first distance between the rotary center and a first point on the workpiece surface co-linear with the longitudinal axis of the electrode disposed in a first position;
   (c) determining a second distance between the rotary center and a second point on the workpiece surface co-linear with the longitudinal axis of the electrode disposed in a second position;
   (d) determining a third distance between the rotary center and a third point on the workpiece surface co-linear with the longitudinal axis of the electrode disposed in a third position;
   (e) determining a first normal direction of the workpiece surface and a second normal direction of the workpiece surface based on the first, second, and third distances determined in steps (b)–(d);
   (f) determining whether the electrode is aligned with respect to the first normal direction and, if the electrode is not aligned with respect to the first normal direction, determining an angle of rotation needed to align the electrode with respect to the first normal direction; and
   (g) determining whether the electrode is aligned with respect to the second normal direction and, if the electrode is not aligned with respect to the second normal direction, determining an angle of rotation needed to align the electrode with respect to the second normal direction.

9. The method of claim 8 wherein the first distance, the second distance, and the third distance each are determined by displacing the electrode along its longitudinal axis into contact with the workpiece, and adding the distance of such displacement to the distance from the rotary center to the distal end of the electrode.

10. The method of claim 8 wherein the workpiece comprises a planar surface containing the first point, the second point, and the third point.

11. The method of claim 10 wherein the aligned position of the electrode is perpendicular to the planar surface of the workpiece.

* * * * *